US010338957B2

(12) United States Patent
Scarlata et al.

(10) Patent No.: US 10,338,957 B2
(45) Date of Patent: Jul. 2, 2019

(54) PROVISIONING KEYS FOR VIRTUAL MACHINE SECURE ENCLAVES

(71) Applicant: Intel Corporation, Santa Clara, CA (US)

(72) Inventors: Vincent R. Scarlata, Beaverton, OR (US); Carlos V. Rozas, Portland, OR (US); Simon P. Johnson, Beaverton, OR (US); Francis X. McKeen, Portland, OR (US); Mona Vij, Hillsboro, OR (US); Somnath Chakrabarti, Portland, OR (US); Brandon Baker, Portland, OR (US); Ittai Anati, Haifa (IL); Ilya Alexandrovich, Yokneam Illit (IL)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 15/391,208

(22) Filed: Dec. 27, 2016

(65) Prior Publication Data

US 2018/0183580 A1    Jun. 28, 2018

(51) Int. Cl.
| | |
|---|---|
| *G06F 9/48* | (2006.01) |
| *H04L 9/08* | (2006.01) |
| *H04L 9/32* | (2006.01) |
| *G06F 21/53* | (2013.01) |
| *G06F 21/60* | (2013.01) |

(52) U.S. Cl.
CPC .......... *G06F 9/4856* (2013.01); *G06F 21/53* (2013.01); *G06F 21/602* (2013.01); *H04L 9/0861* (2013.01); *H04L 9/0897* (2013.01); *H04L 9/3247* (2013.01); *H04L 9/3268* (2013.01)

(58) Field of Classification Search
CPC ..................................................... G06F 9/4856
USPC ........................................................ 380/283
See application file for complete search history.

(56) References Cited

U.S. PATENT DOCUMENTS

| | | | |
|---|---|---|---|
| 9,442,752 B1 * | 9/2016 | Roth ................... | G06F 9/45558 |
| 2012/0266167 A1 * | 10/2012 | Spiers ................. | H04L 63/0218 |
| | | | 718/1 |
| 2013/0097296 A1 | 4/2013 | Gehrmann et al. | |
| 2015/0220745 A1 * | 8/2015 | Nellitheertha .......... | G06F 15/16 |
| | | | 713/193 |
| 2015/0365436 A1 | 12/2015 | Shenefiel et al. | |
| 2016/0149912 A1 | 5/2016 | Scott-Nash et al. | |
| 2016/0285875 A1 | 9/2016 | Lenz et al. | |

(Continued)

OTHER PUBLICATIONS

International Search Report and Written Opinion for PCT Application No. PCT/US2017/062451, dated Mar. 5, 2018, 11 pages.

*Primary Examiner* — Khalil Naghdali
(74) *Attorney, Agent, or Firm* — Alliance IP, LLC

(57) ABSTRACT

A secure migration enclave is provided to identify a launch of a particular virtual machine on a host computing system, where the particular virtual machine is launched to include a secure quoting enclave to perform an attestation of one or more aspects of the virtual machine. A root key for the particular virtual machine is generated using the secure migration enclave hosted on the host computing system for use in association with provisioning the secure quoting enclave with an attestation key to be used in the attestation. The migration enclave registers the root key with a virtual machine registration service.

20 Claims, 9 Drawing Sheets

(56) References Cited

U.S. PATENT DOCUMENTS

2016/0350534 A1   12/2016   Poomachandran et al.
2018/0089461 A1*   3/2018   Williams .............. G06F 21/335

* cited by examiner

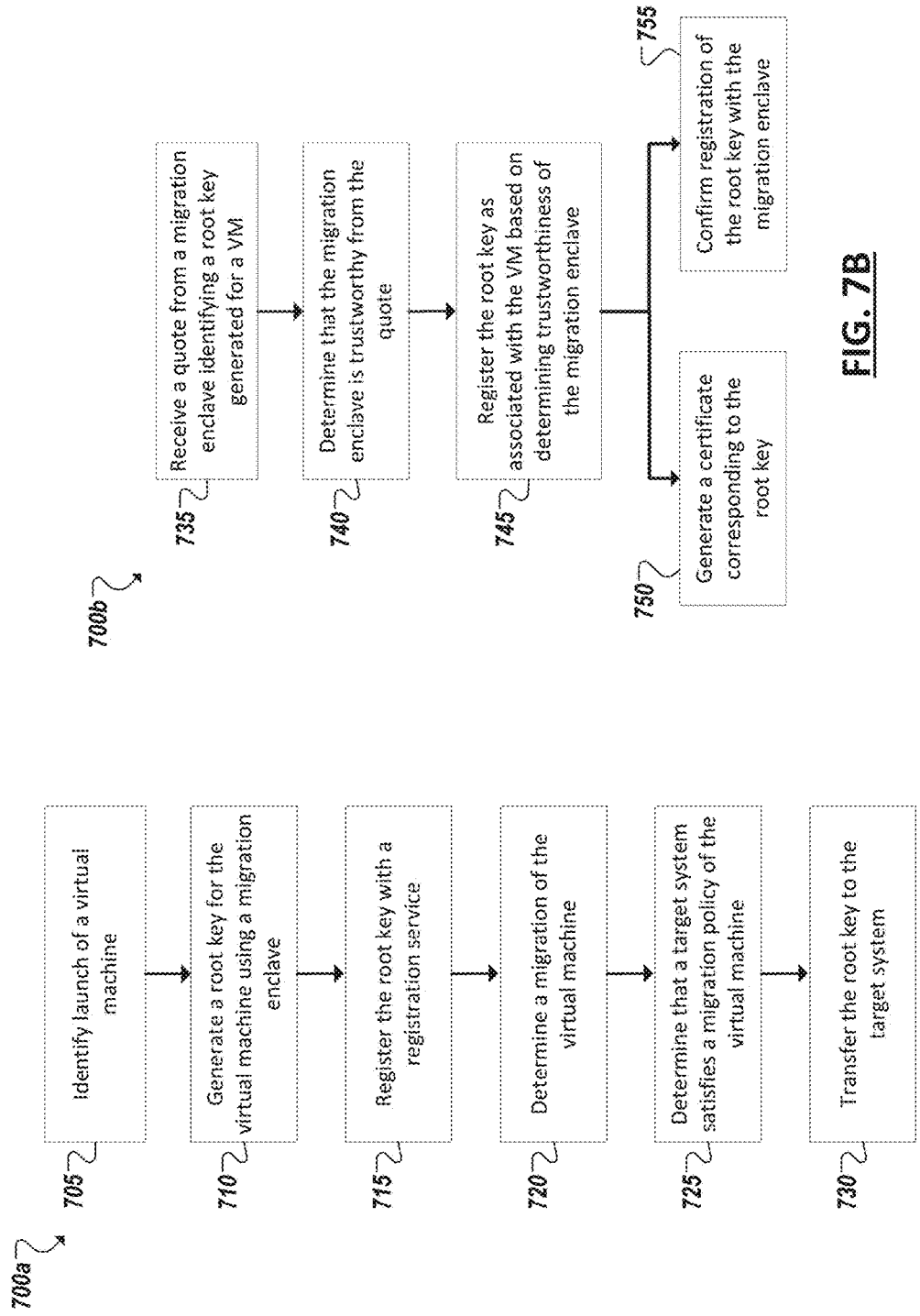

US 10,338,957 B2

PROVISIONING KEYS FOR VIRTUAL MACHINE SECURE ENCLAVES

TECHNICAL FIELD

This disclosure relates in general to the field of computer security and, more particularly, to secure enclaves within a computing system.

BACKGROUND

Software and services can be deployed over the Internet. Some services may be hosted on virtual machines to allow flexible deployment of a service. A virtual machine is an emulation of a computing system and can allow the service to migrate between or be launched simultaneously on multiple physical server systems. Software services may communicate data with other systems over wireline or wireless network. Some of this data may include sensitive content. While encryption and authentication may be utilized to secure communications between systems, trust may be required between the systems in order to facilitate such transactions. Malicious actors have employed techniques such as spoofing, man-in-the-middle attacks, and other actions in an attempt to circumvent safety measures put in place within systems to secure communications. Failure to establish a trusted relationship may make traditional communication security tasks ineffective.

BRIEF DESCRIPTION OF THE DRAWINGS

FIGS. 7A-7B are simplified flow diagrams illustrating example techniques involving the generation and registration of a virtual machine root keys;

Like reference numbers and designations in the various drawings indicate like elements.

DETAILED DESCRIPTION OF EXAMPLE EMBODIMENTS

Figure 1:
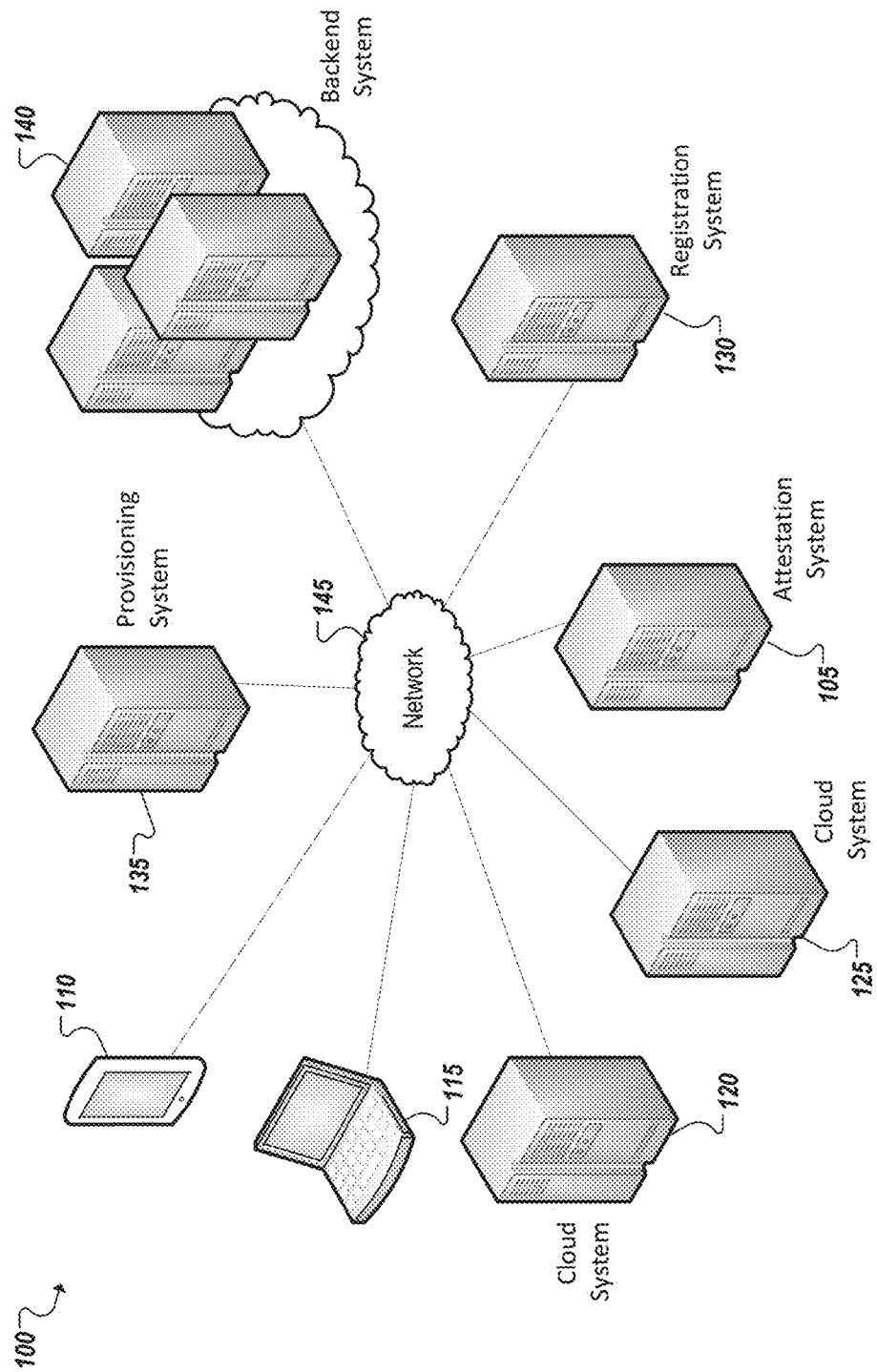
FIG. 1 is a simplified schematic diagram of an example system including a host system to host one or more virtual machines and a registration system to register root keys generated for the virtual machines in accordance with one embodiment.

FIG. 1 is a simplified block diagram illustrating an example embodiment of a computing environment 100 including an example attestation system 105. The attestation system 105 can receive data, or "quotes," generated by secured logical components, or enclaves, running on host systems (e.g., 110, 115, 120, 125) to attest to the authenticity and security (and other characteristics) of another application or enclave of the host and confirm the attestation based on the received quote. Host systems (e.g., 120, 125) can host applications and services and attestation of the host system may be utilized to establish the trustworthiness of both an application or service as well as its host system. In some implementations, an application or service may be implemented through one or more virtual machines hosted on one or more host systems (e.g., 120, 125). A virtual machine, within this disclosure, may refer to a virtual machine, container, or other virtual execution environment in which another software application, program, microservice, or software component may be hosted and run. In some implementations, secure enclaves may be provided in the virtual machines and the applications they host to similarly allow these "host" virtual machines (and their applications) to reliably and securely attest to their authenticity and trustworthiness.

A secure enclave may be embodied as a set of instructions (e.g., implemented in microcode or extended microcode) that provides a safe place for an application to execute code and store data inside in the context of an operating system (OS) or other process. An application that executes in this environment may be referred to as an enclave. Enclaves are executed from a secure enclave cache. In some implementations, pages of the enclave may be loaded into the cache by an OS. Whenever a page of an enclave is removed from the secured cache, cryptographic protections may be used to protect the confidentiality of the enclave and to detect tampering when the enclave is loaded back into the cache. Inside the cache, enclave data may be protected using access control mechanisms provided by the processor. The enclave cache may be where enclave code is executed and protected enclave data is accessed.

In some implementations, the enclave cache may be located within the physical address space of a platform but can be accessed only using secure enclave instructions. A single enclave cache may contain pages from many different enclaves and provides access control mechanism to protect the integrity and confidentiality of the pages. Such a page cache may maintain a coherency protocol similar to the one used for coherent physical memory in the platform. The enclave cache can be instantiated in several ways. For instance, the cache may be constructed of dedicated SRAM on the processor package. The enclave cache may be implemented in cryptographically protected volatile storage using platform DRAM. The cache may use one or more strategically placed cryptographic units in the CPU uncore to provide varying levels of protection. The various uncore agents may be modified to recognize the memory accesses going to the cache, and to route those accesses to a crypto controller located in the uncore. The crypto controller, depending on the desired protection level, generates one or more memory accesses to the platform DRAM to fetch the cipher-text. It may then process the cipher-text to generate the plain-text, and satisfy the original cache memory request.

In some implementations, when a platform loads an enclave it may call a system routine in the operating system. The system may attempt to allocate some pages in the enclave cache. In some implementations, if there is no open space in the cache, the OS may select a victim enclave to remove. The system may add secure enclaves control structure (SECS) to the cache. With the SECS created, the system may add pages to the enclave as requested by the application. A secure enclave SECS is said to be active if it is currently loaded into the cache. In some implementations, a secure enclave may be implemented in a virtual machine. A corresponding OS, virtual machine manager (VMM), etc., may be responsible for managing what gets loaded into the EPC. In some implementations, while loading an enclave page into the EPC, the OS/VMM may inform the CPU the whereabouts of the SECS for that page, except when the page under consideration itself is an SECS. When the page being loaded is not an SECS, the SECS corresponding to the page may be located inside the EPC. Before loading any page for an enclave, the OS/VMM may load the SECS for that enclave into the EPC.

Secure enclaves may be used, in some instances, to seal, or secure, private or secret data utilized by an application or virtual machine, for instance, by encryption using hardware-based or other encryption keys. In some implementations, a specialized secure enclave may be provided to manage keys for a virtual machine (e.g., in connection with a key store provided on the cloud system 105). Secure enclaves may be further utilized to perform attestation of various components of a virtual machine and the application(s) it hosts. Attestation may be the process of demonstrating that a piece of software has been established on the platform especially to a remote entity. In the case of secure enclaves, attestation is the mechanism by which a remote platform establishes that software is running on an authentic (i.e., secure enclave enabled) platform protected within an enclave prior to trusting that software with secrets and protected data. The process of attestation can include measurement of the secure enclave and its host, storage of the measurement results (e.g., in a corresponding SECS), and reporting of measurements (with potentially additional information) through quotes to prove the authenticity of the secure enclave to another entity.

To facilitate the implementation of a secure enclave, machine executable code or logic, implemented in firmware and/or software of the host system (such as code of the CPU of the host), can be provided on the host system that can be utilized by applications or other code local to the host system to set aside private regions of code and data, which are subject to guarantees of heightened security, to implement one or more secure enclaves on the system. For instance, a secure enclave can be used to protect sensitive data from unauthorized access or modification by rogue software running at higher privilege levels and preserve the confidentiality and integrity of sensitive code and data without disrupting the ability of legitimate system software to schedule and manage the use of platform resources. Secure enclaves can enable applications to define secure regions of code and data that maintain confidentiality even when an attacker has physical control of the platform and can conduct direct attacks on memory. Secure enclaves can also enable a host system platform to measure a corresponding application's trusted code and produce a signed attestation, rooted in the processor, that includes this measurement and other certification that the code has been correctly initialized in a trustable environment (and is capable of providing the security features of a secure enclave, such as outlined in the examples above). Generally, secure enclaves (and other secured enclaves described herein) can adopt or build upon principles, features, and functionality described, for instance, in the Intel® Software Guard Extensions (SGX) Programming Reference, among other example platforms.

As noted, attestations may be facilitated through quotes that identify attributes of the system, application, and/or enclave that is being attested to through the quote. The quote may additionally be signed or include data that has been signed by a cryptographic key, cipher, or other element (collectively referred to herein as "keys") from which the attestation system can authenticate or confirm the trustworthiness of the quote (and thereby also the application or enclave attested to by the quote). Such keys can be referred to as attestation keys. A provisioning system 130 can be utilized to securely provision such attestation keys on the various host devices 110, 115, 120, 125, virtual machines, and/or enclaves.

In some cases, attestation can be carried out in connection with a client-server or frontend-backend interaction (e.g., over one or more networks 135) between an application hosted on a host system (e.g., 110, 115, 120, 125) and a backend service hosted by a remote backend system (e.g., 140). Sensitive data and transactions can take place in such interactions and the application can attest to its trustworthiness and security to the backend system (and vice versa) using an attestation system (e.g., 105). In some implementations, the attestation system itself can be hosted on the backend system. In other cases, a backend system (e.g., 140) (or even another host device in a peer-to-peer attestation) can consume the attestation services of a separate attestation system (e.g., 105).

A provisioning system 135 can maintain a database or other repository of certificates mapped to various host devices (e.g., 110, 115, 120, 125) or virtual machines equipped to implement trusted execution environments, or secure enclaves. Each of the certificates can be derived from keys, or root keys, established for the host devices or virtual machines. Such keys may themselves be based on persistently maintained, secure secrets provisioned on the host devices (e.g., 110, 115, 120, 125) during manufacture. In the case of virtual machines or platforms employing multiple devices (e.g., such as a server architecture) the secret may be established for the virtual machine and platform and registered with a registration system 130, among other examples. The root keys or secrets remain secret to the host platform or virtual machine and may be implemented as fuses, a code in secure persistent memory, among other implementations. The key may be the secret itself or a key derived from the secret. The certificate may not identify the key and the key may not be derivable from the certificate, however, signatures produced by the key may be identified as originating from a particular one of the host platforms or virtual machines for which a certificate is maintained based on the corresponding certificate. In this manner, a host device (e.g., 110, 115, 120, 125) or virtual machine can authenticate to the provisioning system 130 and be provided (by the provisioning system 130) with an attestation key that is securely associated with the host device or virtual machine. These attestation keys can then be used by secure enclaves on the corresponding host device (e.g., 110, 115, 120, 125) or virtual machine to perform attestation for one or more applications or enclaves present on the host device.

Various host platforms may interact with an attestation system 105, provisioning systems (e.g., 135), registration system (e.g., 130), and backend systems (e.g., 140) over one or more networks (e.g., 145). Networks 145, in some implementations, can include local and wide area networks, wireless and wireline networks, public and private networks, and any other communication network enabling communication between the systems. Further, two or more of attestation systems (e.g., 105), provisioning systems (e.g., 135), registration system (e.g., 130), and backend systems (e.g., 140) may be combined in a single system. Communications over the networks 145 interconnecting these systems may be secured. In some cases, a secure enclave on a host (e.g., 110, 115, 120, 125) may initiate a communication with an attestation system 105, provisioning systems (e.g., 135), and/or registration system (e.g., 130) using a secure channel, among other examples.

In general, "servers," "devices," "computing devices," "host devices," "user devices," "clients," "servers," "computers," "platforms," "environments," "systems," etc. (e.g., 105, 110, 115, 120, 125, 130, 135, 140, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems. Computing devices may be further equipped with communication modules to facilitate communication with other computing devices over one or more networks (e.g., 145).

Host devices (e.g., 110, 115, 120, 125) can further include computing devices implemented as one or more local and/or remote client or end user devices, such as application servers, personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

A host device (e.g., 110, 115, 120, 125) can be further configured to host one or more virtual machines. For instance, a host device may include a virtual machine monitor (VMM) and/or hypervisor, which may be utilized to host virtual machines on the host device. A host device may additional include or set aside encrypted or otherwise secured memory to facilitate secured enclaves, including secured enclaves to be hosted on or in connection with one or more virtual machines hosted on the host system (e.g., 110, 115, 120, 125), among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
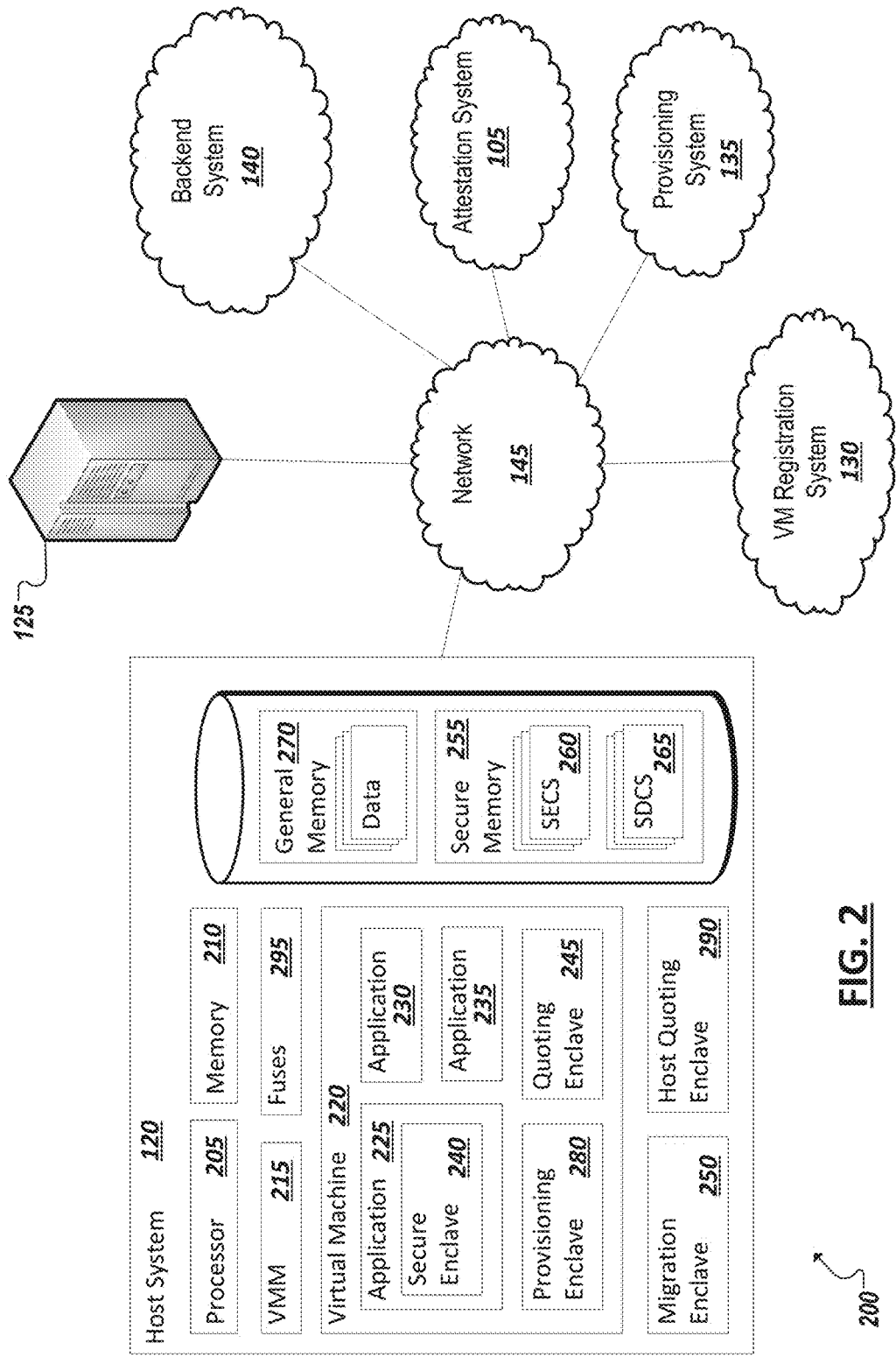
FIG. 2 is a simplified block diagram of an example system including an example host platform to host one or more virtual machines supporting secure enclaves in accordance with one embodiment.

Turning to the example of FIG. 2, a simplified block diagram 200 is shown illustrating a system or computing environment that includes a host system 120 equipped to support one or more secure enclaves (e.g., 240, 245, 250, 280, 290, etc.). A host system 120 can include one or more processor devices 205, one or more memory elements 210, and may in some cases be composed of multiple interconnected devices presenting logically as a single platform (e.g., a multi-processor server system). A host system 120 may additionally include a VMM 215 running on an operating system of host system 120 or running directly on the hardware of the host system 120 (e.g., outside of the host operating system). The VMM 215 may be used to host one or more virtual machines (e.g., 220), which may be used to host one or more applications or services (e.g., 225, 230, 235). One or more of these applications (e.g., 225, 230, 235) may be configured to transact or otherwise communicate with one or more remote backend services (e.g., 140) over one or more networks (e.g., 145). Transactions between an application (e.g., 225) and a backend system (e.g., 140) may involve the transmission of sensitive data or the establishment of secured or trusted communication channels. Security of such data and communication channels may involve the attestation of the application, its host virtual machine 220 and even host system 120. Accordingly, in some implementations, an application may be provided with a secure enclave 240, or application enclave, for use in securing application data and communications between the application (e.g., 225) and other applications, services, or system remote or local to the hosting system (e.g., 120). Secure enclaves can be implemented in secure memory 255 (as opposed to general memory 270) and utilizing secured processing functionality of at least one of the processors (e.g., 205) of the host system to implement private regions of code and data to provide certain secured or protected functionality of the application.

Logic, implemented in firmware and/or software of the host system (such as code of the CPU of the host), can be provided on the host system 110 that can be utilized by applications or other code local to the host system to set aside private regions of code and data, which are subject to guarantees of heightened security, to implement one or more secure enclaves on the system. For instance, a secure enclave can be used to protect sensitive data from unauthorized access or modification by rogue software running at higher privilege levels and preserve the confidentiality and integrity of sensitive code and data without disrupting the ability of legitimate system software to schedule and manage the use of platform resources. Secure enclaves can enable applications to define secure regions of code and data that maintain confidentiality even when an attacker has physical control of the platform and can conduct direct attacks on memory. Secure enclaves can further allow consumers of the host devices (e.g., 110) to retain control of their platforms including the freedom to install and uninstall applications and services as they choose. Secure enclaves can also enable a host system platform to measure a corresponding application's trusted code and produce a signed attestation, rooted in the processor, that includes this measurement and other certification that the code has been correctly initialized in a trustable environment (and is capable of providing the security features of a secure enclave, such as outlined in the examples above). Generally, secure enclaves (and other secured enclaves described herein) can adopt or build upon principles described, for instance, in the Intel® Software Guard Extensions Programming Reference, among other example platforms.

Figure 3:
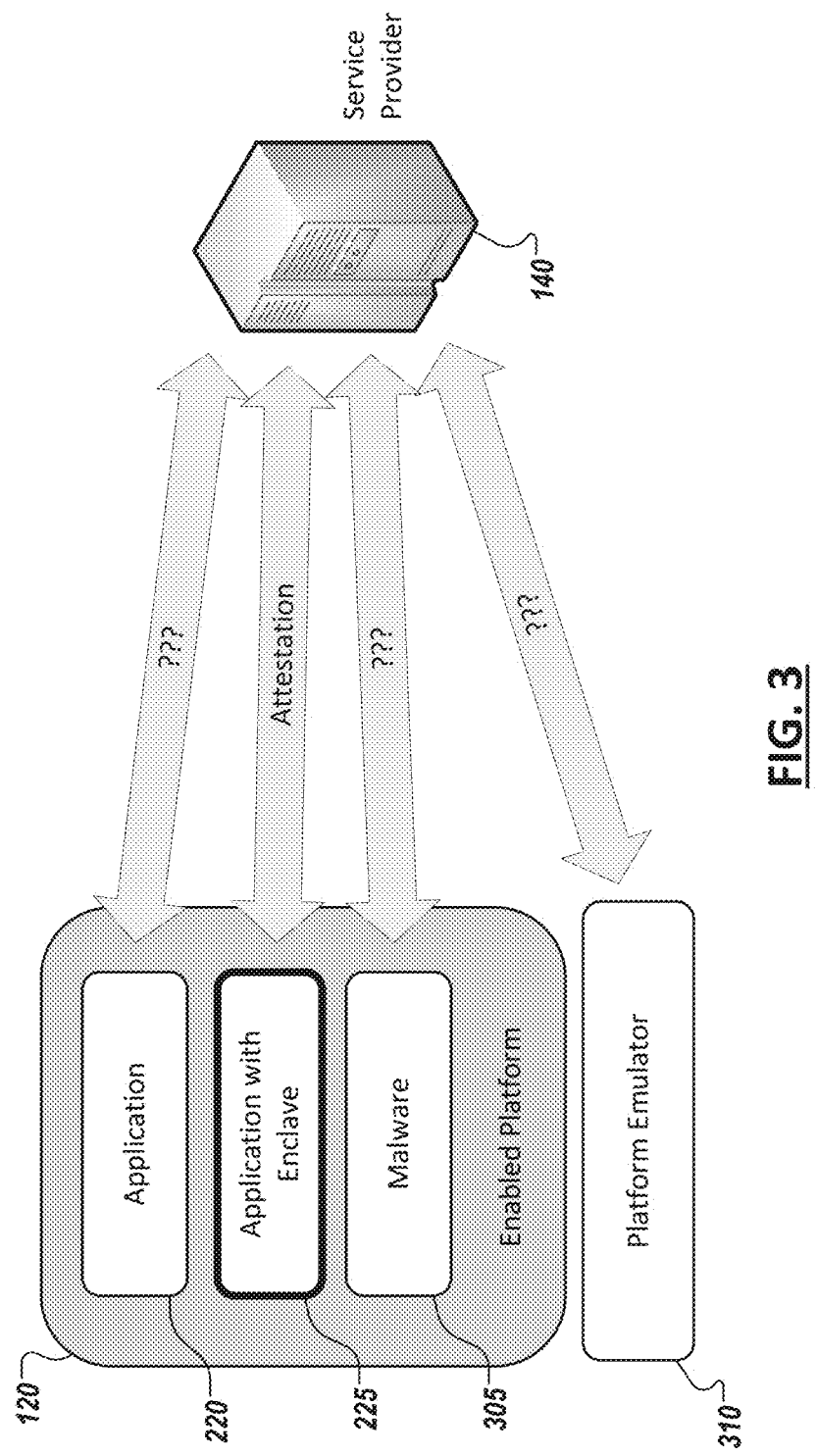
FIG. 3 is a simplified block diagram representing application attestation in accordance with one embodiment.

Turning briefly to FIG. 3, an application enclave can be provided on an application (e.g., 225) to protect all or a portion of a given application and allow the application (and its security features) to be attested to. For instance, a service provider 140, such as a backend service or web service, may prefer or require that clients, with which it interfaces, possess certain security features or guarantees, such that the service 140 can verify that it is transacting with who the client says it is. For instance, malware (e.g., 305) can sometimes be constructed to spoof the identity of a user or an application in an attempt to extract sensitive data from, infect, or otherwise behave maliciously in a transaction with the service 140. Signed attestation (or simply "attestation") can allow an application (e.g., 225) to verify that it is a legitimate instance of the application (i.e., and not malware). Other applications (e.g., 220) that are not equipped with a secure application enclave may be legitimate, but may not attest to the service provider 140, leaving the service provider in doubt, to some degree, of the application's authenticity and trustworthiness. Further, host system platforms (e.g., 120) can be emulated (e.g., by emulator 310) to attempt to transact falsely with the service 140. Attestation through a secure enclave can guard against such insecure, malicious, and faulty transactions.

Returning to FIG. 2, attestation can be provided on the basis of a signed piece of data, or "quote," that is signed using an attestation key securely provisioned on the platform or virtual machine hosting the application. For instance, in the implementation of FIG. 2, an application 225 may be provided that is provided with a secure application enclave 240 for securely maintaining data and/or securely communicating in transactions with a backend system 140. Additional secured enclaves (e.g., 245, 280) can be provided (i.e., separate from the secure application enclave 240) to measure or assess the application 225 and its enclave 235, sign the measurement (included in the quote), and assist in the provisioning one or more of the enclaves with keys for use in signing the quote and establishing secured communication channels between enclaves or between an enclave and an outside service or system (e.g., 105, 130, 135, 140). For instance, one or more provisioning enclaves (e.g., 280) can be provided to interface with a corresponding provisioning system (e.g., 135) to obtain attestation keys for use by a quoting enclave 245 and/or application enclave 240. One or more quoting enclaves 245 can be provided to reliably measure or assess an application 225 and/or the corresponding application enclave 240 and sign the measurement with the attestation key obtained by the provisioning enclave 280 through the corresponding provisioning enclave 135.

In some implementations, a provisioning enclave 280 may further include or interface with a provisioning certification enclave hosted on a virtual machine 220 or platform. A provisioning certification enclave may be used to authenticate the provisioning enclave (e.g., 280) to its corresponding provisioning system (e.g., 135) to attest to the provisioning system that it would be sending a provisioning key to a trustworthy provisioning enclave 280.

The provisioning certification enclave or provisioning enclave 280 can maintain a provisioning attestation key that is based on a secure secret of its how (e.g., the virtual machine 220 and host system 120). Such secrets may be used to support attestation of the trustworthiness of the provisioning enclave 280 to the provisioning system 135, such that the provisioning enclave 280 is authenticated prior to the provisioning system 135 entrusting the provisioning enclave 280 with an attestation key. In some implementations, a provisioning certification enclave can attest to authenticity and security of any one of potentially multiple provisioning enclaves (e.g., 280) provided on the virtual machine 220. For instance, multiple different provisioning enclaves 280 may be provided in some implementations, each interfacing with its own respective provisioning system, providing its own respective attestation keys to one of potentially multiple quoting enclaves (e.g., 245) provided on the virtual machine. For instance, different applications (e.g., 220, 230, 235) may each have their own respective application enclaves (e.g., 240) for use in attestation of the corresponding application, and each quoting enclave can utilize a different attestation key to support the attestation. Further, through the use of multiple provisioning enclaves and provisioning services, different key types and encryption technologies can be used in connection with the attestation of different applications and services (e.g., hosted by backend systems 140).

Secrets of a host platform (e.g., 120) may be secrets set in or derived from fuses 295 of the platform during manufacturing or may be a secret derived from hardware-based secrets of multiple devices making up a host platform (e.g., fuses of individual processors in a multi-processor host platform). A virtual machine, however, may not have a secret at its instantiation, as the virtual machine is "manufactured" on the fly. Accordingly, a host system (e.g., 120) may provide additional functionality to support the creation of secure secrets of a virtual machine at creation of the virtual machine, with these secure secrets then being available for use by one or more of the enclaves (e.g., the provisioning enclave) to support attestation of the trustworthiness of the enclaves to various services (e.g., 105, 135, etc.). This functionality may enable a migration enclave 250 in some implementations. A migration enclave 150 may possess functionality to generate and register root keys for virtual machines generated using a VMM 215 of the host platform 120. Further the migration enclave 150 may possess read and write privileges (e.g., access not afforded to other software or enclaves of the platform) to a particular page of secure (e.g., encrypted) memory 255 embodying a control structure (e.g., secure enclave control structure (SECS)) 260 in which the virtual machine root key may be stored. Indeed, multiple virtual machines may be instantiated on a single host system 120 and the migration engine 250 may generate and write root key secrets for each respective virtual machine in a respective secure control structure 260 corresponding to the VM.

For hardware-based root keys, each root key may be set during manufacture and may be concurrently registered (e.g., by the manufacturer) as belonging to a particular device and being a legitimate key. However, virtual machine keys generated on the fly by a migration enclave 250 (or other secure enclave) may only be known to the migration enclave itself, and would thereby be of little use for attesting to authenticity of the virtual machine or its component enclaves (as provisioning and attestation systems would have no knowledge of the key (or possess certificates based on the key). Accordingly, a key registration system 130 may be provided through which virtual machine root keys may be registered. For instance, a migration enclave 250 can attest of its trustworthiness to the registration system 130 by using a quote that includes a signature of a root key of its host system 120 (using host quoting enclave 290), for which the registration system possess or has access to a corresponding certificate, to allow the registration system to verify that the key (and its corresponding certificate) is from a legitimate and secure migration enclave hosted by a trusted platform (e.g., 120). The registration system 130 may then provide a certificate corresponding to the virtual machine root key generated by a migration enclave 250 to a provisioning system, with which a provisioning enclave 280 may interface to obtain an attestation key for use by a quoting enclave 245 of the same virtual machine 220.

As noted above, a provisioning enclave 280 may be utilized to obtain an attestation key 245 for a virtual machine. A host system 120 may likewise include a provisioning enclave (not shown) to obtain an attestation key for the host system 120. As noted above, a quoting enclave (e.g., 245, 290, etc.) may possess functionality for developing a quote that describes aspects of an enclave, application, or platform and sign the quote with a corresponding attestation key. The signed quote may then be communicated to an attestation system to attest to the veracity of the corresponding enclave, application, or platform. In some implementations, additional pages 265 (e.g., security domain control structures (SDCS)) of secure memory may be provided that correspond to each enclave launched on a platform or virtual machine to store data describing measurements and other attributes of a corresponding enclave, which may accessed by a quoting enclave to generate a corresponding quote.

As noted above, virtual machines may contain secure enclaves bound to the hardware platform. However, virtual machines may be scaled up and scaled down to meet the needs or design of a particular application or service. In some implementations, functionality may be provided to allow virtual machines to be migrated from one secure enclave-enabled platform to another without compromising the security of the enclaves inside the virtual machine or other enclaves bound to the platform outside the virtual machine container. For instance, in addition to providing functionality for generating and registering root keys for one or more virtual machines on a host platform 120, the migration enclave 250 may additionally possess functionality to orchestrate the migration of a virtual machine's image (together with its roots key) from one host system (e.g., 120) to another (e.g., 125). The migration enclave 250 may be constrained by a preset migration policy (e.g., established in connection with registration of the corresponding virtual machine's root key), such that the migration enclave 250 is to only migrate a virtual machine to another trusted system (e.g., 125). In some cases, the migration policy may restrict migration to those host platforms also having a secure migration enclave (as the migration enclave will have access to the root key). The migration enclave 250 may verify that another trusted migration enclave is resident on the destination host platform and may then establish a secure communication channel to communicate the virtual machine's root key to the destination migration enclave. The virtual machine's image will also be conveyed to the target host system, in some cases, include data which has been sealed by the root key or a key derived from the root key, such that the data may be unsealed only if the root key is accessible on the target host system (e.g., through a corresponding migration enclave provisioned on the target system). The migration enclave 250, upon verifying the trustworthiness of the destination platform and migration enclave, may communicate a copy of the root key over the secure channel to allow the destination migration enclave to write the root key to a secure control structure on the destination host and facilitate the unsealing (e.g., access and decrypt) of any secret data in the virtual machine image or in a shared data store. The destination migration enclave may thereby be used to assist in reestablishing the registered virtual machine 220 and allow the virtual machine 220 to continue functioning just as it did (based on the same root key) on the original host platform (e.g., 120), among other example features and implementations.

Figure 4:
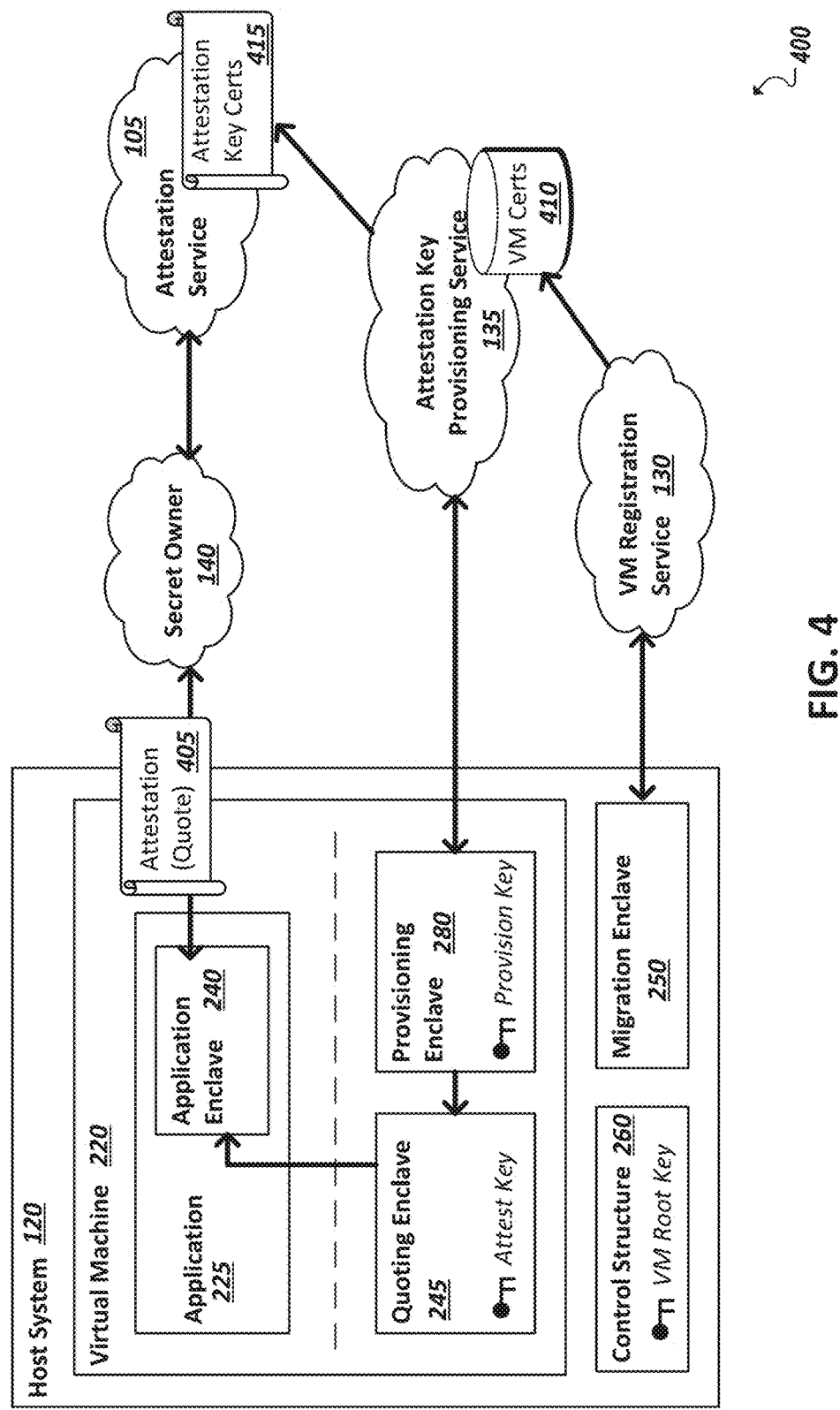
FIG. 4 is a simplified block diagram representing an example registration and use of a virtual machine root key in accordance with one embodiment.

Turning to FIG. 4, a simplified block diagram is illustrated showing the generation, registration, and use of a virtual machine root key by an example migration enclave 250. For instance, a migration enclave 250 may identify the launch of a virtual machine 220 on its host platform 120. In connection with the launch of the virtual machine (e.g., before the virtual machine is live), the migration enclave 250 may generate a root key for the virtual machine 220. In some implementations, the migration enclave may generate a random root key value or apply another algorithm to generate a root key value that is difficult to predict by unauthorized entities. The migration enclave 250 may store the virtual machine root key in the secure control structure 260 and define an association between the root key and the launched virtual machine 220. Access to the virtual machine root key (and the control structure 260 generally) may be limited to the migration enclave 250.

Unlike hardware-based root keys, which are generated by the manufacturer during manufacturer of the hardware (and thereby known by, or "registered with", the manufacturer as being a legitimate root key associated with the corresponding hardware), a virtual machine ("VM") root key, at generation, is only known to the migration enclave 250. Accordingly, the VM root key can initially not be used in attestations with other services, which do not know of the VM root key and its association with the VM 220. To address this, the migration enclave 250 may register the VM root key (and its association with the VM 220) with a trusted outside system, such as VM registration service 130. The registration service 130 may also be used to register other software-generated root keys, such as root keys generated for a system composed of multiple host devices (e.g., where the multiple host devices each have their own distinct hardware root key, but the system operates as a single system, etc.).

In one example, registration of a VM root key may involve the attestation of the migration enclave 250 that generated the VM root key. In one example, the migration enclave 250 may send a quote to the registration service 130 that includes the generated VM root key to attest to the trustworthiness of the migration enclave 250. In some implementations, the migration enclave may piggyback on the trust reputation of the host platform 120 to attest to its own trustworthiness. For instance, the migration enclave 250 may request that a quote be generated by a quoting enclave of the host system 120, which may sign at least a portion of (or all of) the migration enclave quote with a hardware-based root key or host attestation key based on the root key registered to the host system 120. Based on the quote being signed by a host system 120 recognized as possessing functionality to support secure enclaves, and information included in the quote indicating attributes of or otherwise identifying the migration enclave, the registration service may register the received root key, associate the root key with the virtual machine 220 identified in the quote, and generate a certificate corresponding to the received root key. The VM registration service 130 may provide the VM root key certificates to one or more attestation key provisioning services 135. In some cases, the VM registration service 130 may be the attestation key provisioning service 135, while in other cases (e.g., as shown in the illustration of FIG. 4) the VM registration service 130 is separate from the attestation key provisioning service 135. The VM root key may then be used as the basis of attestation-related transactions for the VM. For instance, a provisioning enclave 280 may be provided with a provisioning key derived from the VM root key.

A provisioning key may be used by the provisioning enclave 280 to authenticate the provisioning enclave 280 to an attestation key provisioning service 135. The attestation key provisioning service 135 can maintain device certificates 410 (including certificates for VM root keys generated by the migration enclave 250 and passed to the provisioning service 135 from the registration server 130) that map virtual machines (e.g., 220) and/or devices (e.g., by serial number or other identifier) to corresponding certificates, each certificate generated based on root keys set (and kept in secret) in connection with the VM or device platform. In this manner, certificates can be provided, which do not disclose the secret, but allow the presence of the secret to be verified by the certificate holder (e.g., based on a signature generated from the secret or a key based on the secret). Accordingly, the provisioning enclave 280 can provide signed data to the attestation key provisioning service 135 to attest to its authenticity and that it is implemented on a virtual machine (e.g., 220) registered with the registration service 130 and known to possess functionality enabling the instantiation and hosting of a secure, trustworthy enclave (e.g., 280). Based on this attestation, the attestation key provisioning service 135 can negotiate a secure channel between the attestation key provisioning service 135 and the provisioning enclave 280 and provide an attestation key to the provisioning enclave suite in response. Indeed, the data signed by the provisioning enclave 280 can include information (e.g., signed public keys, protocol identifiers, etc.) used to establish the secure channel. The provisioning enclave 208 of the VM 220 can then provision the VM's quoting enclave 245 with the received attestation key, as shown in the example of FIG. 4.

The quoting enclave 245 can measure or identify attributes of one or more applications (e.g., 225) and/or application enclaves (e.g., 240), as well as the virtual machine 220 and/or hosting platform 120 and can provide this information in a quote containing data, at least a portion of which is signed using the attestation key at the quoting enclave 245. For instance, a quote may identify such characteristics as the type and identifier of the virtual machine, type and identifier of the platform processor (e.g., CPU, chipset, etc.), firmware version used by the processor(s), identification and status of any authenticated code modules (ACMs) of the processor(s), presence of trusted boot functionality, firmware of all trusted devices, software versions for any enclave providing security services, among other examples. The quoting enclave then passes the signed quote to the application enclave 240, which can communicate the quote to a backend service (such as through a secret owner 140 (e.g., hosting secrets usable by the application to decrypt data or access content, etc.) to attest the authenticity of the application 225. In this example, the backend service 140 (e.g., "secret owner") can utilize the services of an attestation service 105, which can receive attestation key certificates 415 and revocation lists generated by the attestation key provisioning service 135 that generated the attestation key used by the quoting enclave 245 of the virtual machine 220. Through these certificates 415, the attestation service 105 can verify the authenticity of the quote based on the signature included in the quote (signed by the attestation key provided by the attestation key provisioning service 135). Upon verifying the authenticity of the quote and further verifying, from the description of the application enclave 240 included in the quote, the characteristics of the application enclave 240 (e.g., that it is a reliably implemented enclave on a capable platform), the attestation service 105 can communicate the results of the attestation to the backend service 140. From these results, the backend service 140 can provide a level of service (or grant/deny service entirely), allow the application 225 (through the application enclave 240) access to particular data owned by the secret owner, establish protected communication channels between the secret owner's system and the application enclave 240, issuance of certificates from a certificate authority, allow sensor-type platforms to pair with a coordination point and/or allow data to be accepted from sensors (e.g., in an Internet of Things system), among potentially limitless other examples, based on whether or not the application is protected by a trustworthy application enclave.

Figure 5:
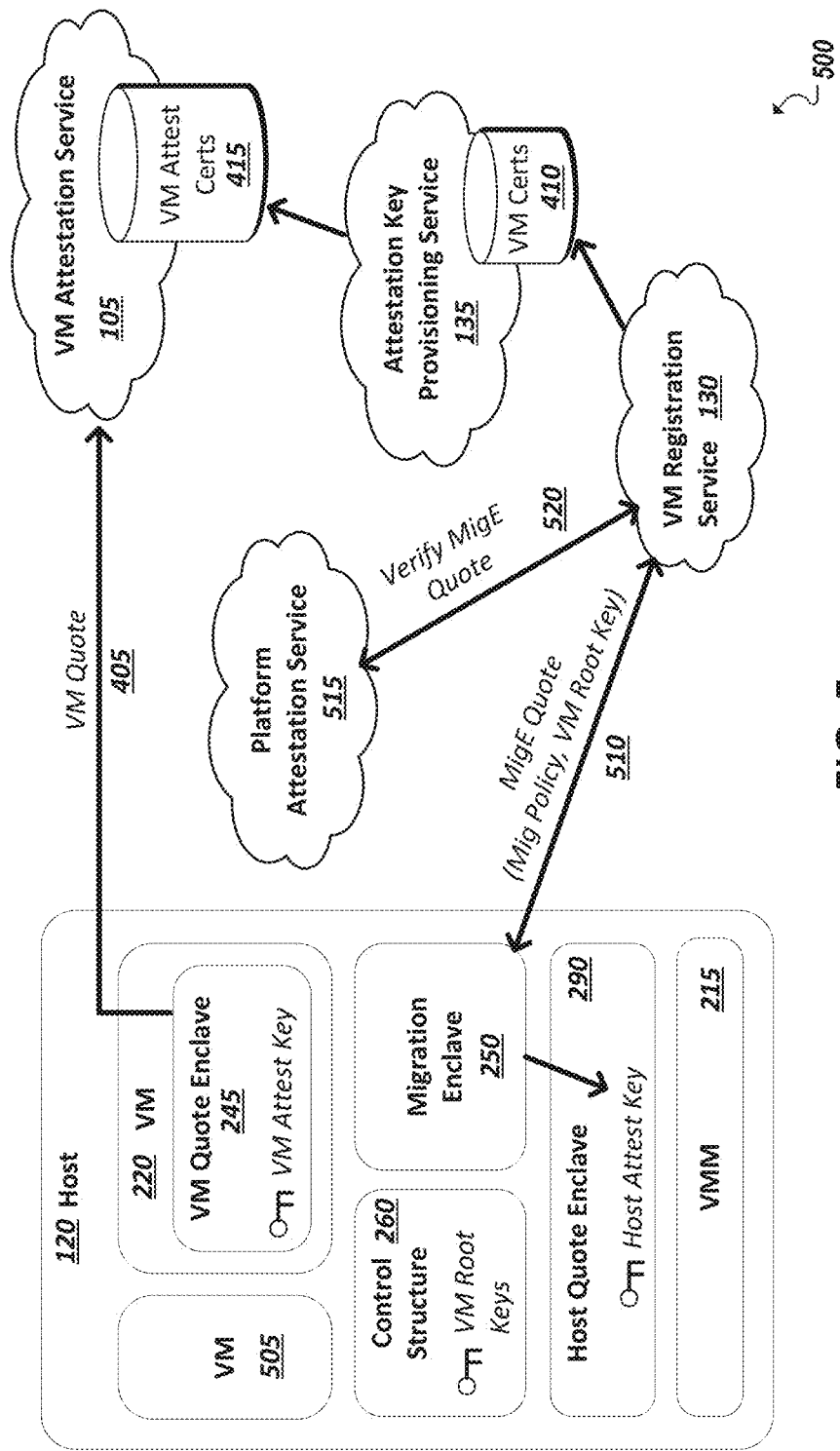
FIG. 5 is a simplified block diagram representing another example of registration and use of a virtual machine root key in accordance with one embodiment.

Turning to the example of FIG. 5, a simplified block diagram 500 is shown illustrating another example of attestation based on a registered VM root key generated using a migration enclave 250. For instance, the migration enclave 250 may generate a root key for a virtual machine 220 upon the initiation of the VM 220 on a particular host platform 120. The host platform may simultaneously host multiple VMs (e.g., 220, 505) and the migration enclave 250 of the host 120 may generate unique VM root keys for each of the VMs 220, 505 and store the respective root keys in a respective secure control structure 260 provided for each VM hosted in encrypted memory of the host platform 120 upon registration of the respective keys. To register a VM root key, the migration enclave may send a quote ("MigE Quote") 510 to a trusted registration service 130. The quote 510 may include a copy of the VM root key and information (e.g., identifier, version identifier, measurements, identification of its host platform, etc.) describing the migration enclave 250. The quote may be signed using the host attestation key of the host quote enclave 290, allowing the registration service 130 to determine whether the migration enclave is run on a trusted host platform and may be trusted itself. To ascertain this, the registration service 130, in some cases, may need to utilize another system (e.g., platform attestation service 515). As noted, the quote 510 of the migration enclave may be signed by a host attestation key based on the root keys of the host platform or processor (e.g., 120). Accordingly, an attestation service 515 having attestation certificates corresponding to the host platform of the requesting migration enclave 250 may be identified by the VM registration service 130 (e.g., from an identifier of the host included in the quote 510). The VM registration service 130 may then engage in a quote verification transaction with the platform attestation service 515 to verify whether the migration enclave's quote 515 has been signed by the quote enclave of a trusted platform. In some cases, the verification may also identify whether the quote 515 has been signed by a platform which the migration enclave claims it is hosted by, or by a platform known to support a secure migration enclave, among other examples.

In some implementations, a migration enclave quote 510 may additionally include information concerning the policies governing migrations of the VM 220 from one platform to another using the migration enclave 250. In some cases, the migration policy (Mig Policy) may be included in the quote 510 and outline the conditions for migration of the VM and sharing of the VM root key. In some implementations, registration of a key may be conditioned on a sufficiently stringent migration policy being articulated by the requesting migration enclave 250 (e.g., in its quote 510). Migration can involve the VM image and the VM root key being transferred to another host platform under management of another migration enclave, so the trustworthiness of the migration enclave 250 requesting VM root key registration may be considered only as good as the other migration enclaves to which the VM image and root key may potentially by migrated. Accordingly, a migration policy may specify that migrations will be limited to host platforms that possess a migration enclave (and supporting hardware) of a sufficient level of trustworthiness (e.g., comparable to or exceeding that of the requesting migration enclave 250).

Continuing with the example of FIG. 5, upon verifying (e.g., with help of a platform attestation service 515) that a particular VM root key generated by a particular migration enclave 250 can be trusted as secure, a VM registration service 130 can confirm the acceptability of the VM root key to the migration enclave 250 and may generate a corresponding certificate from the VM root key and provide the certificate to a VM attestation key provisioning service 135. In some cases, the attestation key provisioning service may host certificates based on both platform and VM root keys. The migration enclave 250, upon receiving notice that the VM root key has been registered by the registration service 130 may secure the VM root key in a control structure 260 only accessible to the migration enclave 130. The root keys may then be used to provision a quoting enclave 245 of the corresponding VM 220 with a VM attestation key, which may be used to attest to the trustworthiness of one or more other secure enclaves and/or applications hosted on the VM 220 (e.g., through quotes 405 sent to a corresponding attestation service 105 with access to certificates 415 based on the attestation key). The VM root key may also be used to derive a sealing key that is to be used to "seal," or encrypt or otherwise secure, other secret and sensitive data (e.g., sensitive user data), hosted on the VM or control structures corresponding to the VM, among other examples uses. A sealing key may also be used to seal aspects (e.g., sensitive code or data) in a VM image until the VM image is paired again with an instance of a secure migration enclave holding the root key of the corresponding VM (e.g., after a migration).

While some of the examples described herein articulate the original creation of VM root keys by a migration enclave (or other secure enclave) of a host platform, in should be appreciated that VM root keys may be established for a VM through other techniques (e.g., and secured in a control structure by a migration enclave). For instance, in one alternative, a centralized service may pre-generate a collection of VM root keys and corresponding root key certificates, with the centralized service then replacing the registration service. The migration enclave may attest to its trustworthiness to the centralized service (e.g., using a quote generated by its host platform's quoting enclave) and request a root key for an identified VM to be instantiated on the host platform. The centralized service may associate the identified VM with a particular one of the collection of pre-generated root keys and provide the particular root key to the migration enclave for use as the root key for the identified VM. The centralized service may then provide the corresponding certificate to a provisioning service or other service for use in verifying signatures generated at the VM based on the root key. In yet another example, virtual machine images may be pre-generated together with their root key and the root key and VM may be pre-registered (e.g., by the creator of the VM image or an outside registration service). Certificates may also be pre-generated and as the VM images are accessed to instantiate the VM for the first time from the pre-generated VM image (with the control structure storing the pre-generated VM root key), the certificate and its association with the VM may be communicated to a provisioning service or other attestation service for use in verifying quotes later generated by enclaves of the instantiated VM, among other examples.

Figure 6:
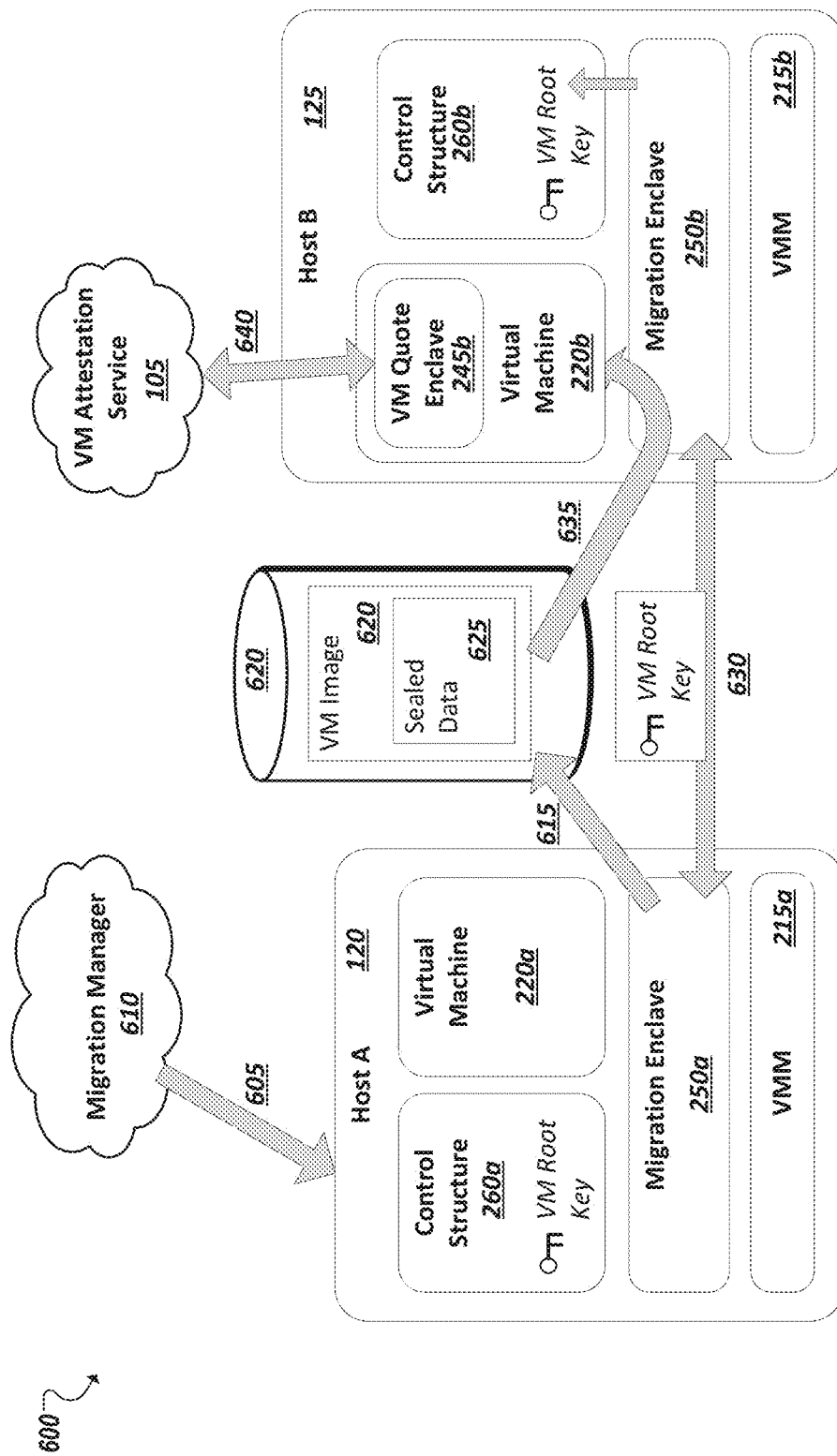
FIG. 6 is a simplified block diagram representing an example migration of a virtual machine in accordance with one embodiment.

Turning to FIG. 6, a simplified block diagram 600 is shown illustrating an example migration of a virtual machine from one host system 120 to another 125 using migration enclaves (e.g., 250*a,b*). In this particular example, an instruction 605 may be received at a host 120 currently hosting a particular virtual machine 220*a*. In this example, VM 220*a* has been registered with a registration service such that a VM root key generated by a migration enclave 250*a* on the host 120 has been registered with the registration service. The corresponding VM 220*a* may include one or more applications running on top of it, together with one or more secure enclaves. Various enclaves, sensitive data, and processes may be secured through the utilization of the VM root key (stored in a secure control structure 260*a* of the host 120). The migration instruction 605 may be received, in some implementations, by a migration manager 610 managing migration, and in some cases dynamic migration, of VMs among multiple potential host systems (e.g., 120, 125) within an environment. In some implementations, the migration manager 610 may communicate directly with the migration enclave (e.g., 250*a*) of the host (e.g., 120). In other cases, another component of the host 120 may receive the migration request 605 and communicate the migration request 605 information to the migration enclave. This information may identify a target host system (e.g., 125) to which the migration of the instance of the particular VM 220*a* is to occur. In other cases, the migration request 605 may simply indicate that the VM 220*a* is to be migrated from a particular source host system (e.g., 120). In such cases, the migration enclave 250*a* may identify a potential target host (e.g., 125) and attempt to communicate with the migration enclave 250*b* of the target host 125.

In order to facilitate a migration, a migration enclave 250*a* may identify a target host system (e.g., 125) and attempt to communicate with a migration enclave 250*b* on the target system (e.g., 125) to determine whether migration to the target host is in compliance with a migration policy established for instances of the virtual machine 220*a* (and set in connection with registration of the VM root key for the VM 220*a*). A secure communication channel may be established between the migration enclaves 250*a*, 250*b* and the target migration enclave 250*b* may attempt to prove that it satisfies the requirements established in the migration policy of the VM 220*a*. In some cases, an attestation may be performed by the target migration enclave 250*b* (e.g., based on root keys and attestation keys of its host 125 and calls by the transferring migration enclave 250*a* to an attestation service corresponding to the host 125) to satisfy that the target migration enclave 250*b* is in compliance with the migration policy. In other implementations, the migration enclaves 250a, 250b may utilize the migration manager 610 for assistance in proving that the target migration enclave 250b satisfies the migration policy, among other examples.

In preparation for or in response to a request 605 to migrate the VM 220a, the migration enclave may copy 615 the image 620 of VM 220a to a data store 620 accessible to both the source and destination hosts (e.g., 120, 125) in a migration. The VM image 620 may include sealed or encrypted data 625, which is only capable of being unlocked through the use of the corresponding sealing key derived from the VM root key (e.g., either the VM root key itself or other keys derivable from the VM root key by the migration enclave or a secure process in the hardware instruction set, etc.). In other cases, the entire VM image 620 may be sealed using a VM root key-based sealing key, among other example implementations.

Upon establishing that the target migration enclave 250b is trustworthy, a secure channel may be established (or remain established) between the source and target migration enclaves 250a, 250b, and the source migration enclave 250a may communicate the VM root key 630 directly and securely to the destination migration enclave 250b. When the migration is to proceed, the VM image 620 may be obtained by the destination host 125 (e.g., by the migration enclave 250b or the VMM 215b) and the migration enclave 250b can utilize the VM root key to unlock the sealed portions 625 of the VM image to allow the VM to be re-instantiated (as VM 220b) on the destination host 125 with all of the applications, secret data, secure enclaves, etc. as in the source instance (e.g., 220a) of the VM. The VM instance 220b may be identical in substantially every regard as the VM instance 220a on the source host 120. The target migration enclave 250b may provide the received VM root key in a control structure 260b established for the VM 220b and the VM instance 220b. Further, the secure enclaves (e.g., quote enclave 245b) and component applications of the new VM instance 220b may continue operation as before (with VM instance 220a). The provisioning of the VM root key on the new instantiation of the VM with secure enclaves may facilitate attestation 640 of one or more applications or enclaves on the VM 220b by a VM attestation service 105 based on the same registered VM root key as originally generated by a migration enclave (e.g., 250a) of an earlier source host (e.g., 120). For instance, an attestation key may be accessed (from the sealed VM image data) or may be provisioned using the received VM root key to allow a VM quoting enclave 245 to generate a quote for a particular application of the VM to attest to the attestation service 105 of the trustworthiness of the particular application (and/or its application enclave), among other examples. In some cases, the instance 220a of the VM may be torn down (e.g., by VMM 215a) before the migration is completed, while in other cases the other instance may be retained as a redundant instance or may be torn down concurrently with the migration, among other examples.

Turning to FIGS. 7A-7B, flowcharts 700a-b are shown illustrating example techniques involving the generation and registration of a VM root key by a secure enclave. In the example of FIG. 7A, launch of a VM on a host computing system is identified by a secure enclave on the host system. In some cases, the secure enclave may be a migration enclave and may possess functionality to assist in establishing the VM on the host. A root key may be generated 710 by the secure enclave for the VM. In some cases, the root key value may be originally generated by the secure enclave, while in other implementations, the secure enclave may obtain the root key from a key source (e.g., a registration service, a depository of keys pregenerated and authorized by a customer or other entity, etc.). The secure enclave may communicate with a registration service to indicate that the root key is to apply to a particular virtual service and register 715 the key. In some cases, registration 715 can include attestation by the secure enclave of its trustworthiness and the legitimacy of the root key to be registered.

Upon registration of the root key, the root key may be secured in encrypted or otherwise secured memory of the host system. In some cases, the root key may be stored in a secure control structure to which access is reserved for the secure enclave. The root key may then be used to perform a variety of functions on the VM, including attestation of applications, enclaves, and other components of the VM, encrypting data (e.g., secrets, user data, etc.), among other example uses. The secure enclave (e.g., a migration enclave), having privileged access to the VM root key may participate in migration of the VM from one host system to another. For instance, the migration enclave may determine 720 that migration of the VM is or will commence from a source system to a destination system. In some cases, the secure enclave will receive a request (e.g., from the VMM or a migration manager) to assist with a migration. The secure enclave may determine 725 whether a target system in the migration satisfies a migration policy associated with the VM (and root key) being migrated. For instance, the secure enclave may receive data from a target migration enclave on the target system attempting to establish that the target migration enclave (and system) satisfy the migration policy. Upon determining that the target system satisfies the migration policy, the source migration enclave may assist in transferring or pointing to a copy of the VM image and may also send a copy of the VM root key over a secure channel to the target migration enclave to complete the migration. The target migration enclave may be called upon, itself, to subsequently assist in another migration, and may likewise test potential destination host systems for compliance with the same migration policy before further passing the VM root key to another system, and so on.

Turning to the example of FIG. 7B, a registration service system may be utilized to communicate with a secure enclave (e.g., a migration enclave) of a host system to register a VM root key established by the secure enclave for a particular VM hosted by the host system. In one example, a quote may be received 735 by the registration service system from the migration enclave. A secure channel may be first established between the registration service system and the migration enclave, over which the quote may be sent. In some instances, the quote may include root key and may indicate various attributes of the migration enclave, a migration policy to be associated with the root key, attributes of the host system, etc. At least a portion of the quote data may be signed using a secret corresponding to the host system. For instance, a key derived from a hardware based root key of the host platform of the migration enclave may be used to sign the quote. From the quote, the registration service may determine 740 whether the migration enclave and its root key may be validated and trusted. In some implementations, the registration service may access a bank of certificates (or access another system hosting such certificates) to determine if the quote has been signed by a legitimate key or key associated with the host platform identified in the quote, among other examples. If the registration service system determines that the migration enclave and root key are trustworthy, the registration service system may register 745 the root key as associated with the VM identified in the quote. The registration service system may further generate a certificate 750 corresponding to the root key and provide this certificate to an attestation service (that may use the certificate to verify future quotes involving the VM or to provision additional attestation keys for the VM, among other examples). The registration service system may also send data to the migration enclave in response to the quote to confirm 755 the successful registration of the root key for the VM, thereby allowing the migration enclave to begin using the root key, among other example features and implementations.

Figure 9:
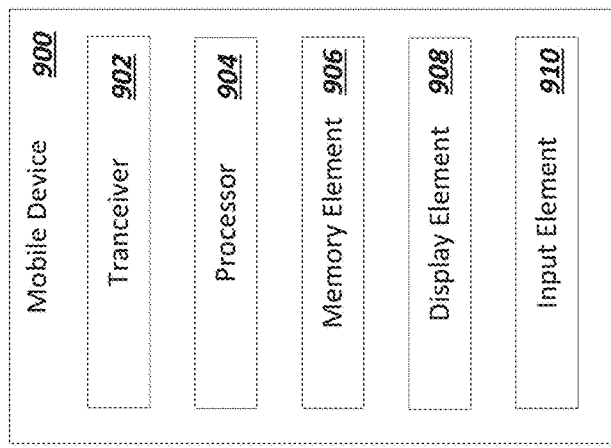
FIG. 9 is a block diagram of an exemplary mobile device system in accordance with one embodiment.
Figure 8:
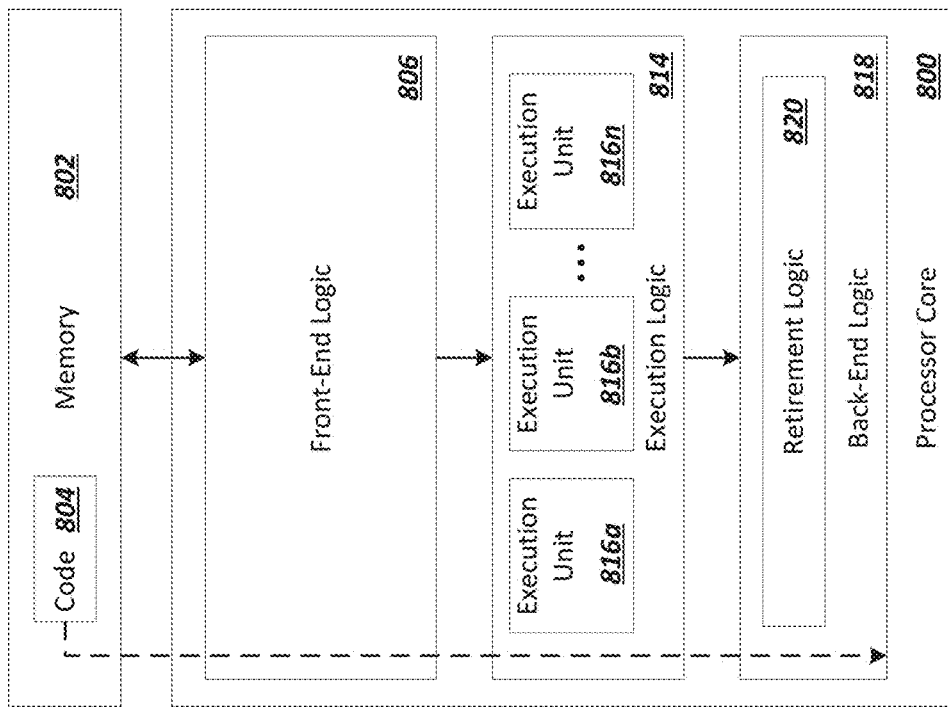
FIG. 8 is a block is a block diagram of an exemplary processor in accordance with one embodiment.
Figure 10:
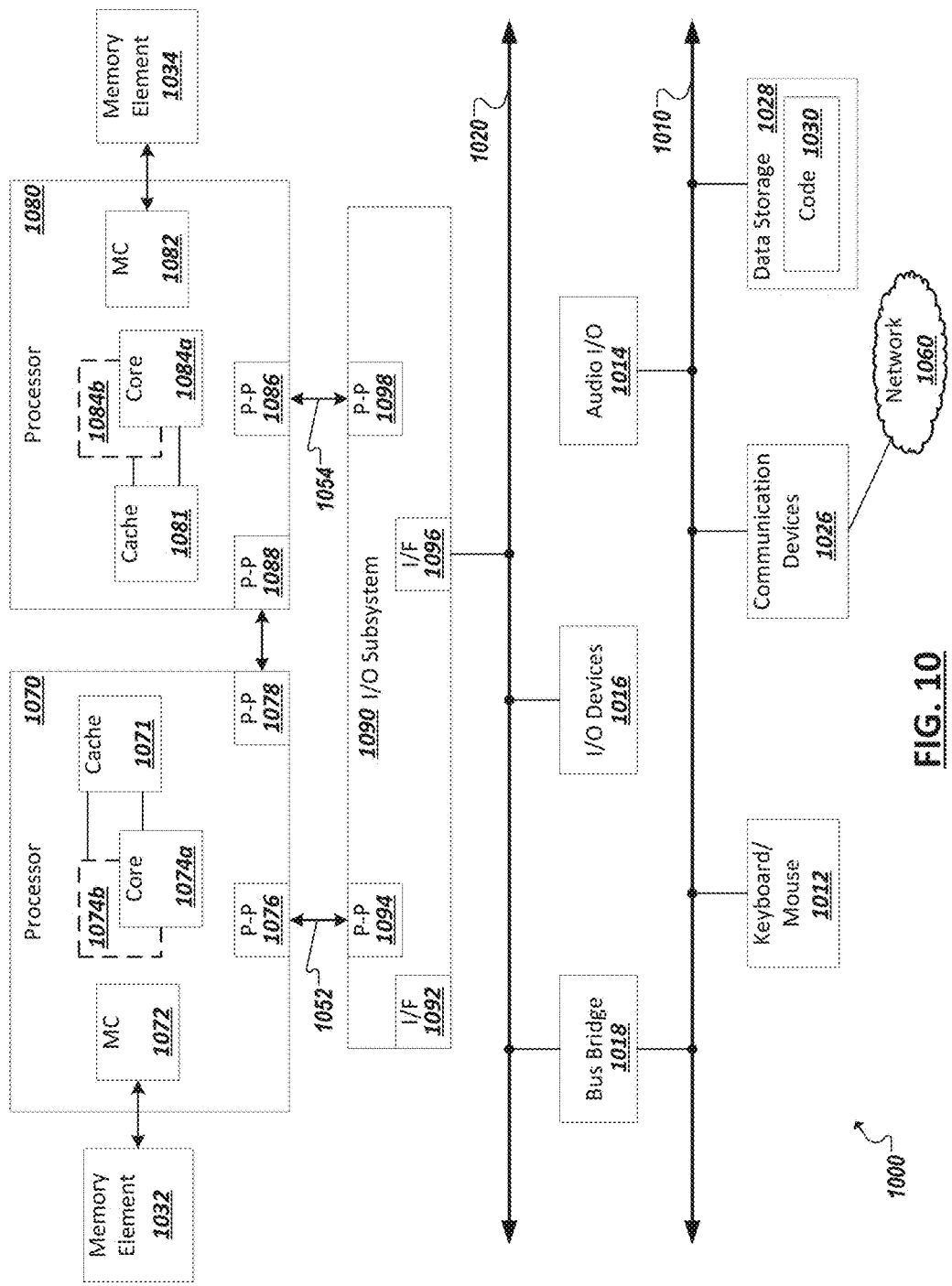
FIG. 10 is a block diagram of an exemplary computing system in accordance with one embodiment.

FIGS. 8-10 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 8-10.

FIG. 8 is an example illustration of a processor according to an embodiment. Processor 800 is an example of a type of hardware device that can be used in connection with the implementations above.

Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

Referring now to FIG. 9, a block diagram is illustrated of an example mobile device 900. Mobile device 900 is an example of a possible computing system (e.g., a host or endpoint device) of the examples and implementations described herein. In an embodiment, mobile device 900 operates as a transmitter and a receiver of wireless communications signals. Specifically, in one example, mobile device 900 may be capable of both transmitting and receiving cellular network voice and data mobile services. Mobile services include such functionality as full Internet access, downloadable and streaming video content, as well as voice telephone communications.

Mobile device 900 may correspond to a conventional wireless or cellular portable telephone, such as a handset that is capable of receiving "3G", or "third generation" cellular services. In another example, mobile device 900 may be capable of transmitting and receiving "4G" mobile services as well, or any other mobile service.

Examples of devices that can correspond to mobile device 900 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 900 illustrated in FIG. 9 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 900 includes a transceiver 902, which is connected to and in communication with an antenna. Transceiver 902 may be a radio frequency transceiver. Also, wireless signals may be transmitted and received via transceiver 902. Transceiver 902 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 902 is connected to a processor 904, which may perform the bulk of the digital signal processing of signals to be communicated and signals received, at the baseband frequency. Processor 904 can provide a graphics interface to a display element 908, for the display of text, graphics, and video to a user, as well as an input element 910 for accepting inputs from users, such as a touchpad, keypad, roller mouse, and other examples. Processor 904 may include an embodiment such as shown and described with reference to processor 800 of FIG. 8.

In an aspect of this disclosure, processor 904 may be a processor that can execute any type of instructions to achieve the functionality and operations as detailed herein. Processor 904 may also be coupled to a memory element 906 for storing information and data used in operations performed using the processor 904. Additional details of an example processor 904 and memory element 906 are subsequently described herein. In an example embodiment, mobile device 900 may be designed with a system-on-a-chip (SoC) architecture, which integrates many or all components of the mobile device into a single chip, in at least some embodiments.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a high-performance graphics circuit 1038 via a high-performance graphics interface 1039, using an interface circuit 1092, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a keyboard/mouse 1012 (or other input devices such as a touch screen, trackball, etc.), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

The following examples pertain to embodiments in accordance with this Specification. One or more embodiments may provide an apparatus, a system, a machine readable storage, a machine readable medium, hardware- and/or software-based logic (e.g., memory buffer logic), and method to identify a launch of a particular virtual machine on a host computing system, where the particular virtual machine is launched to include a secure quoting enclave to perform an attestation of one or more aspects of the virtual machine. A root key for the particular virtual machine is generated using a secure migration enclave hosted on the host computing system for use in association with provisioning the secure quoting enclave with an attestation key to be used in the attestation. The root key is registered with a virtual machine registration service.

In one example, the migration enclave is to participate in migration of an image of the particular virtual machine to another host computing system, establish a secure communication channel between the migration enclave of the host computing system with a migration enclave of the other host computing system, and send the root key to the migration enclave of the other host computing system over the secure communication channel in association with migrating the virtual image to the other host computing system.

In one example, the migration enclave receives data from the migration enclave of the other host computing system and determines from the data that the migration enclave of the other host computing system complies with a migration policy associated with the particular virtual machine.

In one example, the root key is communicated to the migration enclave of the other host computing system based on determining that the migration enclave of the other host computing system complies with the migration policy.

In one example, registering the root key with a virtual machine registration service includes identifying the migration policy to the virtual machine registration service.

In one example, the image includes secret data encrypted using a sealing key derived from the root key.

In one example, the migration enclave stores the root key in a control data structure included in secure memory of the host computing system.

In one example, access to the control data structure is limited to the migration enclave.

In one example, generation of the root key includes creating the root key at the migration enclave.

In one example, generating the root key includes sending a request for a root key from the migration enclave to the virtual machine registration service and receiving the root key at the migration enclave from the virtual machine registration service over a secure channel, where the root key includes a pre-generated key and registering the root key includes identifying that the particular virtual machine is to be associated with the request and the received root key.

In one example, the migration enclave is to generate and control access to a respective root key for each one of a plurality of virtual machines hosted on the host computing system, and the plurality of virtual machines includes the particular virtual machine.

In one example, registering the root key includes sending a quote to the virtual machine registration service, the quote includes the root key and a migration policy to be associated with the root key, and the at least a portion of the quote is signed by a hardware-based key of the host computing system.

One or more embodiments may provide an apparatus, a system, a machine readable storage, a machine readable medium, hardware- and/or software-based logic (e.g., memory buffer logic), and method to receive, over a secure communication channel, quote data from a secure migration enclave hosted on a particular host computing system, where at least a portion of the quote data is signed by a hardware based key of the particular host computing system and the quote data includes a copy of a root key generated by the migration enclave for a particular virtual machine to be hosted on the particular host computing system. The migration enclave is determined to be a trusted enclave based on the quote data and the root key is associated with the particular virtual machine based on determining that the migration enclave is a trusted enclave. A certificate is generated for the root key and data is sent to the migration enclave to indicate that the root key is registered with a registration system.

In one example, the quote data identifies one or more attributes of the migration enclave and a migration policy for the particular virtual machine, and the migration policy identifies rules for migrating the particular virtual machine to other host computing systems.

In one example, a platform attestation service is identified that corresponds to the particular host computing system and hosts certificates corresponding to root keys of a set of systems including the particular host computing system, a request including at least the signed portion of the quote data is sent to the platform attestation service; and a validation result is received from the platform attestation service indicating whether the quote data was signed by a valid key of the particular host computing system, where determining that the migration enclave is a trusted enclave is based on the validation result.

In one example, the certificate is provided to an attestation service and identify that the certificate corresponds to the particular virtual machine, where the attestation service is to use the certificate to determine authenticity of one or more quotes generated for the particular virtual machine based on the root key.

One or more embodiments may provide a system including a processor, a memory including encrypted memory, a virtual machine manager, and a secure migration enclave. The virtual machine manager is to initiate launch of a virtual machine on a particular host computer, where the virtual machine includes one or more applications and a virtual machine quoting enclave to generate a quote for attestation of one or more aspects of the virtual machine. The secure migration enclave is to generate a root key for the virtual machine in association with launch of the virtual machine, store the root key in a secure control structure in the encrypted memory, and register the root key with a virtual machine registration service. The root key is to be used in association with provisioning the quoting enclave with an attestation key to be used by the quoting enclave in the attestation. In one example, registering the root key includes sending a migration enclave quote to the virtual machine registration service, and the system further includes a host quoting enclave provisioned with a host attestation key and configured to generate the migration enclave quote, where the host attestation key is based on a root key of the particular host computer and at least a portion of the migration enclave quote is signed by the host attestation key.

In one example, the virtual machine further includes a key provisioning enclave to attest to a provisioning service that the provisioning enclave is trustworthy based on a provisioning key derived from the root key, receive a virtual machine attestation key from the provisioning service, and provision the virtual machine quoting enclave with the virtual machine attestation key, where at least a portion of the quote is to be signed by the virtual machine quoting enclave using the virtual machine attestation key.

In one example, the migration enclave is further to determine that another host computing system complies with a migration policy associated with the virtual machine, and send the root key to the other host computing system in association with migration of an image of the virtual machine to the other host computing system based on determining that the other host computing system complies with the migration policy.

In one example, at least a portion of the image of the virtual machine is sealed by a sealing key derived from the root key.

In one example, the system further includes the virtual machine registration service. The virtual machine registration service may be executable to receive, over a secure communication channel, quote data from the migration enclave hosted in association with registration of the root key, where at least a portion of the quote data is signed by a hardware based key of the particular host computer and the quote data includes a copy of a root key. The virtual machine registration service may further determine that the migration enclave is a trusted enclave based on the quote data, associate the root key with the virtual machine based on determining that the migration enclave is a trusted enclave, generate a certificate for the root key, and send data to the migration enclave to confirm registration of the root key.

In one example, the virtual machine registration service determining that the migration enclave is trusted includes identifying a platform attestation service corresponding to the particular host computing system that hosts certificates corresponding to root keys of a set of systems including the particular host computing system, sending a request including at least the signed portion of the quote data to the platform attestation service, and receiving a validation result from the platform attestation service indicating whether the quote data was signed by a valid key of the particular host computing system, where determining that the migration enclave is a trusted enclave is based on the validation result.

In one example, the virtual machine registration service is further to provide the certificate to an attestation service and identify that the certificate corresponds to the particular virtual machine, where the attestation service is to use the certificate to determine authenticity of one or more quotes generated for the particular virtual machine based on the root key.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having code stored thereon, the code when executed on a machine, causes the machine to:
   identify a launch of a particular virtual machine on a host computing system, wherein the particular virtual machine is launched to comprise a secure quoting enclave to perform an attestation of one or more aspects of the virtual machine;
   generate, using a secure migration enclave hosted on the host computing system, a root key for the particular virtual machine, wherein the root key is to be used in association with provisioning the secure quoting enclave with an attestation key to be used in the attestation; and
   register the root key with a virtual machine registration service.

2. The storage medium of claim 1, wherein the code is further executable to:
   participate in migration of an image of the particular virtual machine to another host computing system;
   establish a secure communication channel between the migration enclave of the host computing system with a migration enclave of the other host computing system; and
   send the root key to the migration enclave of the other host computing system over the secure communication channel in association with migrating the virtual image to the other host computing system.

3. The storage medium of claim 2, wherein the code is further executable to:
   receive data from the migration enclave of the other host computing system;
   determine from the data that the migration enclave of the other host computing system complies with a migration policy associated with the particular virtual machine.

4. The storage medium of claim 3, wherein the root key is communicated to the migration enclave of the other host computing system based on determining that the migration enclave of the other host computing system complies with the migration policy.

5. The storage medium of claim 3, wherein registering the root key with a virtual machine registration service comprises identifying the migration policy to the virtual machine registration service.

6. The storage medium of claim 2, wherein the image comprises secret data encrypted using a sealing key derived from the root key.

7. The storage medium of claim 1, wherein the code is further executable to store the root key in a control data structure included in secure memory of the host computing system.

8. The storage medium of claim 7, wherein access to the control data structure is limited to the migration enclave.

9. The storage medium of claim 1, wherein generation of the root key comprises creating the root key at the migration enclave.

10. The storage medium of claim 1, wherein generating the root key comprises:
    sending a request for a root key from the migration enclave to the virtual machine registration service; and
    receiving the root key at the migration enclave from the virtual machine registration service over a secure channel,
    wherein the root key comprises a pre-generated key and registering the root key comprises identifying that the particular virtual machine is to be associated with the request and the received root key.

11. The storage medium of claim 1, wherein the migration enclave is to generate and control access to a respective root key for each one of a plurality of virtual machines hosted on the host computing system, and the plurality of virtual machines comprises the particular virtual machine.

12. The storage medium of claim 1, wherein registering the root key comprises sending quote data to the virtual machine registration service, the quote data comprises the root key and a migration policy to be associated with the root key, and the at least a portion of the quote data is signed by a hardware-based key of the host computing system.

13. At least one non-transitory machine accessible storage medium having code stored thereon, the code when executed on a machine, causes the machine to:
    receive, over a secure communication channel, quote data from a secure migration enclave hosted on a particular host computing system, wherein at least a portion of the quote data is signed by a hardware based key of the particular host computing system and the quote data comprises a copy of a root key generated by the migration enclave for a particular virtual machine to be hosted on the particular host computing system;

determine that the migration enclave is a trusted enclave based on the quote data;

associate the root key with the particular virtual machine based on determining that the migration enclave is a trusted enclave;

generate a certificate for the root key; and send data to the migration enclave to indicate that the root key is registered with a registration system.

14. The storage medium of claim 13, wherein the quote data identifies one or more attributes of the migration enclave and a migration policy for the particular virtual machine, and the migration policy identifies rules for migrating the particular virtual machine to other host computing systems.

15. The storage medium of claim 13, wherein the code is further executable to identify a platform attestation service corresponding to the particular host computing system, wherein the platform attestation service hosts certificates corresponding to root keys of a set of systems comprising the particular host computing system;

send a request comprising at least the signed portion of the quote data to the platform attestation service; and receive a validation result from the platform attestation service indicating whether the quote data was signed by a valid key of the particular host computing system, wherein determining that the migration enclave is a trusted enclave is based on the validation result.

16. The storage medium of claim 13, wherein the code is further executable to provide the certificate to an attestation service and identify that the certificate corresponds to the particular virtual machine, wherein the attestation service is to use the certificate to determine authenticity of quote data generated for the particular virtual machine based on the root key.

17. A system comprising:
a processor;
a memory comprising encrypted memory;
a virtual machine manager to initiate launch of a virtual machine on a particular host computer, wherein the virtual machine comprises:
  one or more applications; and
  a virtual machine quoting enclave to generate quote data for attestation of one or more aspects of the virtual machine; and
a secure migration enclave to:
  generate a root key for the virtual machine in association with launch of the virtual machine, wherein the root key is to be used in association with provisioning the quoting enclave with an attestation key to be used by the quoting enclave in the attestation;
  store the root key in a secure control structure in the encrypted memory; and
  register the root key with a virtual machine registration service.

18. The system of claim 17, wherein registering the root key comprises sending migration enclave quote data to the virtual machine registration service, and the system further comprises a host quoting enclave provisioned with a host attestation key and configured to generate the migration enclave quote data, wherein the host attestation key is based on a root key of the particular host computer and at least a portion of the migration enclave quote data is signed by the host attestation key.

19. The system of claim 17, wherein the virtual machine further comprises a key provisioning enclave to:
attest to a provisioning service that the provisioning enclave is trustworthy based on a provisioning key derived from the root key;
receive a virtual machine attestation key from the provisioning service; and
provision the virtual machine quoting enclave with the virtual machine attestation key, wherein at least a portion of the quote data is to be signed by the virtual machine quoting enclave using the virtual machine attestation key.

20. The system of claim 17, wherein the migration enclave is further to:
determine that another host computing system complies with a migration policy associated with the virtual machine; and
send the root key to the other host computing system in association with migration of an image of the virtual machine to the other host computing system based on determining that the other host computing system complies with the migration policy.

* * * * *